United States Patent
Lee et al.

(10) Patent No.: US 9,313,412 B2
(45) Date of Patent: Apr. 12, 2016

(54) IMAGE SENSOR AND OPERATING METHOD THEREOF

(71) Applicant: PIXART IMAGING, INC., Hsin-Chu County (TW)

(72) Inventors: Chuan-Hsin Lee, Hsin-Chu County (TW); Wen-Han Yao, Hsin-Chu County (TW)

(73) Assignee: Pixart Imaging, Inc., Hsin-Chu (TW)

( * ) Notice: Subject to any disclaimer, the term of this patent is extended or adjusted under 35 U.S.C. 154(b) by 163 days.

(21) Appl. No.: 14/090,429

(22) Filed: Nov. 26, 2013

(65) Prior Publication Data
US 2014/0232893 A1    Aug. 21, 2014

(30) Foreign Application Priority Data

Nov. 26, 2012  (TW) .............................. 101144248 A
Apr. 24, 2013  (TW) .............................. 102114787 A

(51) Int. Cl.
*H04N 5/235*  (2006.01)
*G06K 9/46*   (2006.01)
*G06T 7/20*   (2006.01)
*G06T 7/00*   (2006.01)

(52) U.S. Cl.
CPC .............. *H04N 5/235* (2013.01); *G06K 9/4604* (2013.01); *G06T 7/0085* (2013.01); *G06T 7/2033* (2013.01)

(58) Field of Classification Search
None
See application file for complete search history.

(56) References Cited

U.S. PATENT DOCUMENTS

| | | | | |
|---|---|---|---|---|
| 5,311,305 A * | 5/1994 | Mahadevan | ........... | G01S 3/7864 348/169 |
| 8,355,569 B2 * | 1/2013 | Takahashi | ............. | G06T 7/0081 382/165 |
| 8,379,989 B2 * | 2/2013 | Osugi | ................ | G06K 9/00791 382/190 |
| 8,582,821 B1 * | 11/2013 | Feldman | ................. | G06T 7/204 348/169 |
| 8,675,970 B2 * | 3/2014 | Fukushi | ............... | G06K 9/0014 382/118 |
| 8,687,895 B2 * | 4/2014 | Tsunematsu | .......... | G06T 7/0083 382/199 |
| 8,705,796 B2 * | 4/2014 | Ogata | ................. | B60R 21/0134 382/103 |
| 8,873,865 B2 * | 10/2014 | Sung | .................... | G06K 9/4604 382/199 |
| 8,923,612 B2 * | 12/2014 | Yokokawa | ......... | H04N 1/40068 382/165 |
| 2003/0072476 A1 * | 4/2003 | Kim | .......................... | G06T 7/60 382/128 |
| 2003/0235327 A1 * | 12/2003 | Srinivasa | ............. | G06K 9/3241 382/104 |

(Continued)

FOREIGN PATENT DOCUMENTS

| TW | 201016016 A | 4/2010 |
|---|---|---|
| TW | 201039248 A | 11/2010 |
| TW | 201225631 A | 6/2012 |

*Primary Examiner* — Michael Osinski
(74) *Attorney, Agent, or Firm* — Rosenberg, Klein & Lee

(57) ABSTRACT

There is provided an image sensor including a light sensitive device and a digital signal processing circuit. The light sensitive device is configured to output a digital image. The digital signal processing circuit is configured to detect at least one feature point in the digital image and calculate a feature point coordinate of the at least one feature point.

6 Claims, 6 Drawing Sheets

(56) References Cited

U.S. PATENT DOCUMENTS

| | | | | |
|---|---|---|---|---|
| 2005/0207652 | A1* | 9/2005 | Albertelli | G06K 9/3233 382/199 |
| 2006/0171594 | A1* | 8/2006 | Avidan | G06K 9/38 382/224 |
| 2008/0273811 | A1* | 11/2008 | Jung | H04N 5/208 382/262 |
| 2009/0148013 | A1* | 6/2009 | Metaxas | G06T 7/0075 382/128 |
| 2009/0154808 | A1* | 6/2009 | Gao | G06K 9/00791 382/173 |
| 2009/0226097 | A1* | 9/2009 | Matsumoto | G06T 3/403 382/199 |
| 2009/0252373 | A1* | 10/2009 | Paglieroni | G06K 9/00637 382/103 |
| 2010/0027839 | A1* | 2/2010 | Sikka | G06K 9/00335 382/103 |
| 2010/0188520 | A1* | 7/2010 | In | H04N 5/232 348/222.1 |
| 2010/0278436 | A1* | 11/2010 | Tsai | G06K 9/3258 382/209 |
| 2011/0182352 | A1 | 7/2011 | Pace | |
| 2012/0014453 | A1* | 1/2012 | Kawai | H04N 5/145 375/240.16 |
| 2012/0081578 | A1 | 4/2012 | Cote et al. | |
| 2012/0224744 | A1* | 9/2012 | Perbet | G06T 7/208 382/103 |
| 2012/0275711 | A1* | 11/2012 | Inaba | G06K 9/4623 382/201 |
| 2013/0089261 | A1* | 4/2013 | Sung | G06K 9/4604 382/199 |
| 2013/0335575 | A1* | 12/2013 | Tsin | G06T 7/0046 348/169 |
| 2014/0049612 | A1* | 2/2014 | Ishii | G01B 11/00 348/46 |
| 2015/0213312 | A1* | 7/2015 | Hirano | H04N 1/40062 382/165 |

* cited by examiner

IMAGE SENSOR AND OPERATING METHOD THEREOF

CROSS REFERENCE TO RELATED APPLICATION

This application claims the priority benefit of Taiwan Patent Application Serial Number 101144248, filed on Nov. 26, 2012 and Taiwan Patent Application Serial Number 102114787, filed on Apr. 24, 2012, the full disclosure of which are incorporated herein by reference.

BACKGROUND

1. Field of the Disclosure

This disclosure generally relates to a sensing device and, more particularly, to an image sensor and an operating method thereof that integrate an arithmetic logic into the digital signal processing circuit.

2. Description of the Related Art

Current feature detections are mostly applied to the pre-processing of the computer vision technology, and the computer vision calculation is then performed by using the detected feature points. Generally speaking, the feature points are obtained from the acquired image by using the software method and the feature points are then compared using software.

More specifically speaking, as the feature points in the image obtained according to the user definition have a higher uniqueness in the image space, higher comparison accuracy can be obtained in the image matching process. In other words, the post computer vision calculation is generally performed by using the feature points, In a word, the conventional method utilizes an image sensor to provide an outputted image and then utilizes the calculation unit of computers or portable devices to perform the searching and detection of the feature points in the outputted image.

SUMMARY

The present disclosure provides an image sensor that integrates an arithmetic logic into the digital signal processing circuit thereby having a high efficient feature detection performance.

Other objects and advantages of the present disclosure will become more apparent from the following detailed technical features of the present disclosure.

In order to achieve one, a part of or all objects above or other objects, the present disclosure provides an image sensor including a light sensitive device and a digital signal processing circuit. The light sensitive device is configured to output a digital image. The digital signal processing circuit includes a feature detection circuit configured to detect at least one corner feature in the digital image and calculate a feature point coordinate of the at least one corner feature.

The present disclosure provides an image sensor including a light sensitive device, a memory unit and a feature detection circuit. The light sensitive device is configured to output a digital image. The feature detection circuit includes a corner detecting arithmetic logic, a corner response arithmetic logic and a non-maximum suppression arithmetic logic. The corner detecting arithmetic logic is configured to detect at least one corner coordinate in the digital image for being saved in the memory unit. The corner response arithmetic logic is configured to calculate a corner response value corresponding to each the corner coordinate. The non-maximum suppression arithmetic logic is configured to remove the corner coordinate, within a predetermined pixel range, that does not have a maximum response value from the memory unit.

The present disclosure provides an operating method of an image sensor including the steps of: capturing a digital image with a light sensitive device; and calculating and outputting, using a processing circuit, a feature point coordinate of at least one feature point in the digital image.

In one aspect, the method of detecting the feature point in the digital image may be performed by using corner detection.

In one aspect, the image sensor may further include a feature describing arithmetic logic configured to calculate a recognition feature of the feature point.

In one aspect, the image sensor may further include a feature matching circuit configured to match the feature points having the most similar recognition features in successive digital images.

In one aspect, the image sensor may further include a feature tracking circuit configured to track the feature point in successive digital images.

As mentioned above, the image sensor of the present disclosure may output the preview image real-timely and the position or feature value of the feature point in the digital image, perform the feature point matching according to the feature points detected in successive digital images and further obtain the motion vector of the object having feature point(s) in an image sequence. In addition, the image sensor of this embodiment may use the detected feature point to track the feature points in the followed image sequence. When the feature points under tracking disappear or are not enough, it is able to perform the feature point detection of the digital image again so as to maintain the number of the feature points under tracking. In addition, the image sensor of this embodiment may use a plurality of image sensors having the feature detection function to perform the feature point matching according to the feature points acquired at the same time but at different locations. It is able to use the physical spatial relationship of the image sensors to obtain the depth of the object having feature point(s) in the digital image for being applied to the 3D vision application.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

The above or other technical contents, characteristics and effects according to the present disclosure will become more apparent from the following detailed description of a preferred embodiment in conjunction with the accompanying drawings. It is to be understood that terms of direction used herein, such as upward, downward, leftward, rightward, forward and backward, are only used for reference but not used to limit the present disclosure.

Figure 1:
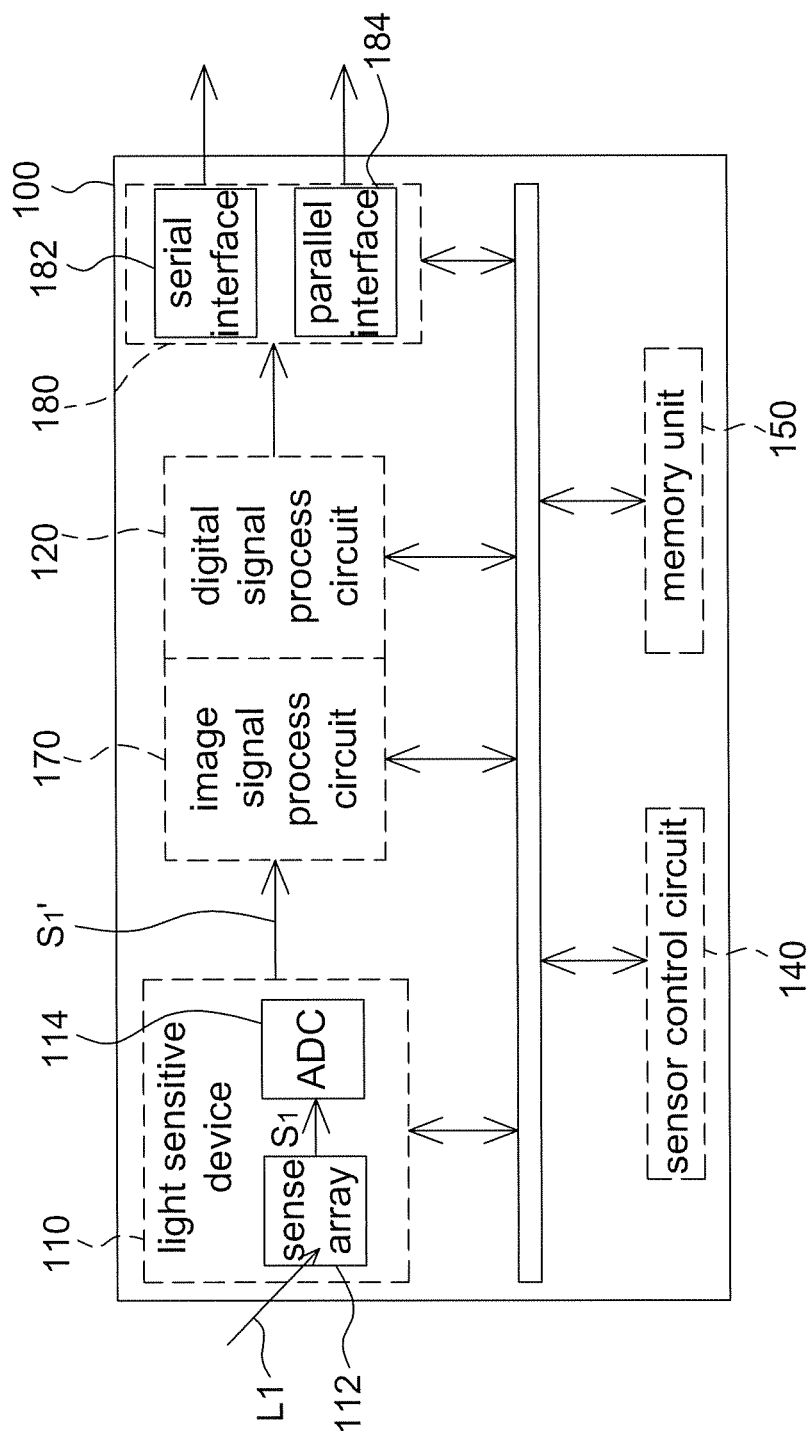
FIG. 1 shows a schematic block diagram of the image sensor according to an embodiment of the present disclosure.
Figure 2:
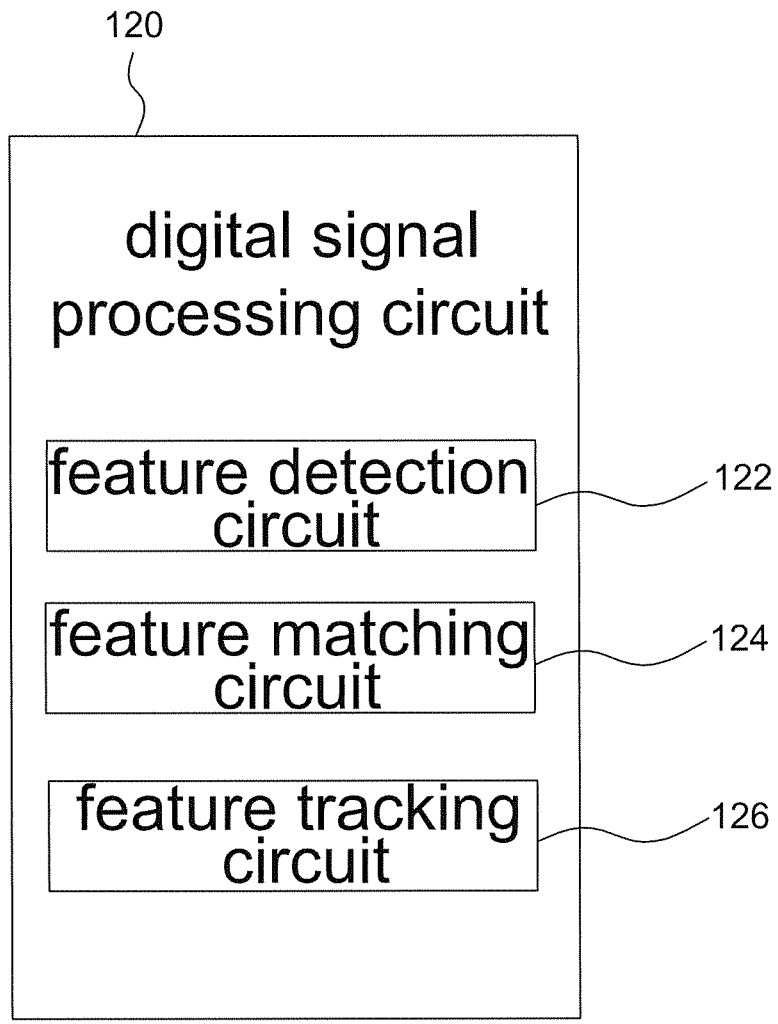
FIG. 2 shows a schematic block diagram of the digital signal processing circuit in the image sensor of FIG. 1.
Figure 3:
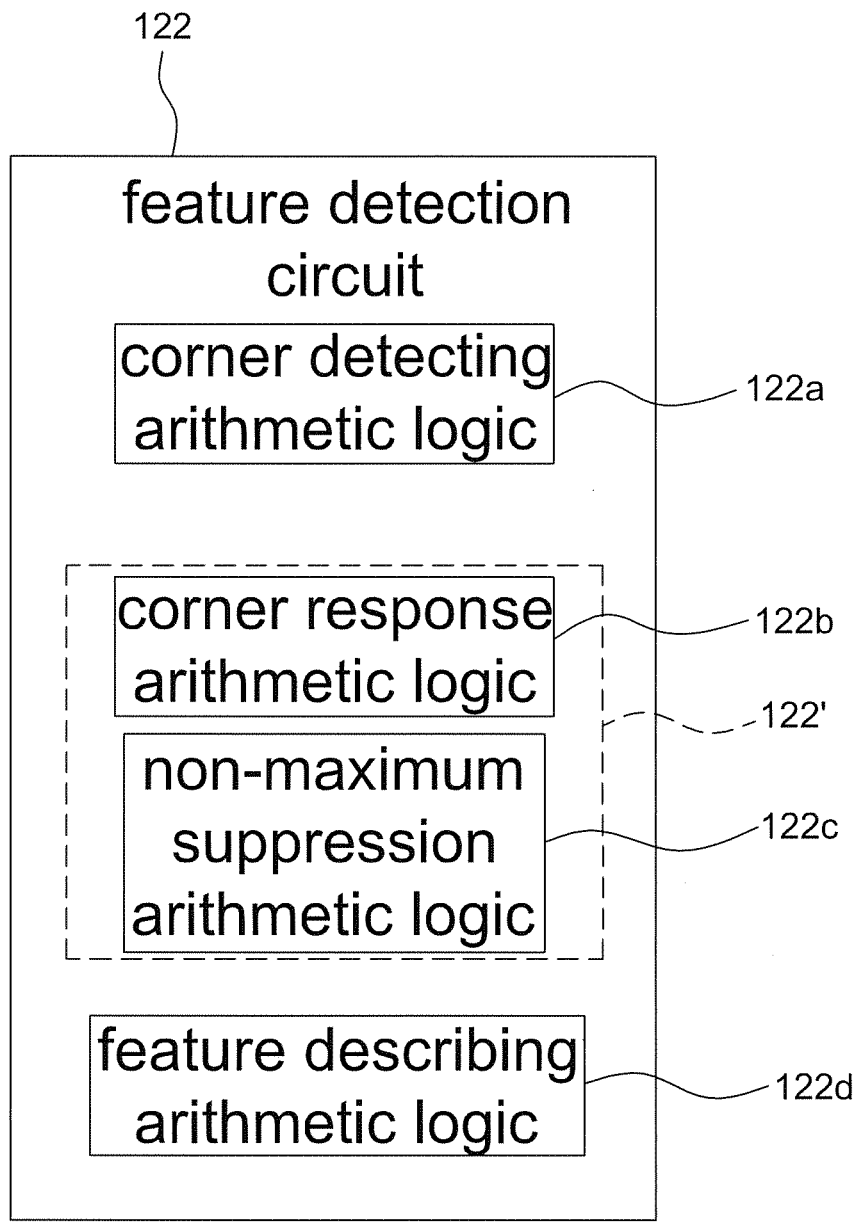
FIG. 3 shows a schematic block diagram of the feature detection circuit in the digital signal processing circuit of FIG. 2.

FIG. 1 shows a schematic diagram of the image sensor according to an embodiment of the present disclosure. FIG. 2 shows a schematic block diagram of the digital signal processing circuit in the image sensor of FIG. 1 and FIG. 3 shows a schematic block diagram of the feature detection circuit in the digital signal processing circuit of FIG. 2. Firstly referring to FIGS. 1 and 2, the image sensor 100 of this embodiment includes a light sensitive device 110 and a digital signal processing circuit 120. Generally speaking, the light sensitive device 110 includes a light sensing array 112 and an analog-to-digital conversion (ADC) circuit 114, and thus when an image light beam L1 impinges on the light sensitive device 110, the light sensing array 112 senses the image light beam L1 and generates the corresponding image signal $S_1$, wherein the image signal $S_1$ generated by the light sensing array 112 is an analog signal. In order to allow the digital signal processing circuit 120 to calculate the image signal $S_1$, the ADC circuit 114 in the light sensitive device 110 converts the analog image signal $S_1$ to a digital image $S_1'$ for being calculated and processed later by the digital signal processing circuit 120. In other words, the light sensitive device 110 is configured to detect the image light beam L1 and output the digital image $S_1'$.

In the present embodiment, the digital signal processing circuit 120 may include a feature detection circuit 122, wherein after the digital signal processing circuit 120 receives the digital image $S_1'$, the feature detection circuit 122 may process and calculate the digital image $S_1'$ so as to detect the feature point in the digital image $S_1'$. In the present embodiment, the feature detection circuit 122 may detect the corner feature in the digital image $S_1'$ by using the corner detection algorithm, wherein the feature detection algorithm may be the Harris, FAST, Shi_Tomasi, LoG/DoG, SIFT, SURF and SUSAN algorithm. In another embodiment, the feature detection circuit 122 may not detect the corner feature but detect other image features, e.g. the cross feature, as long as the feature point in the digital image $S_1'$ may be detected for the post-processing, wherein said post-processing may include the feature matching or the feature tracking, but not limited thereto.

Figures 4A, 4B:
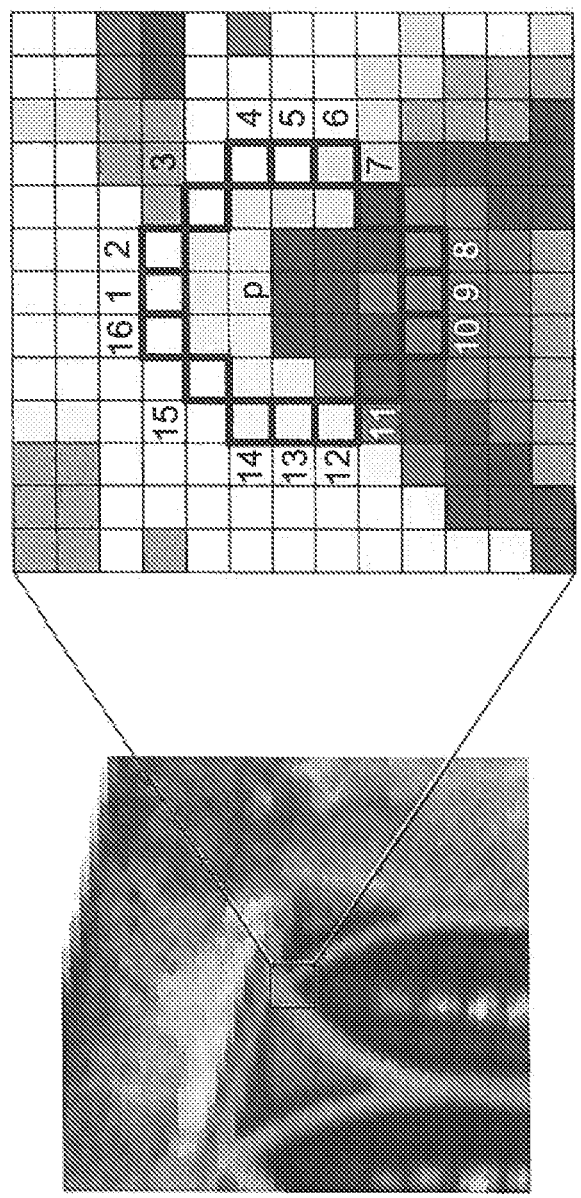
FIGS. 4A and 4B show schematic diagrams of performing the corner detection by the corner detecting arithmetic logic.

More specifically speaking, the feature detection circuit 122 at least includes a corner detecting arithmetic logic 122a as shown in FIG. 3, wherein the corner detecting arithmetic logic 122a may be configured to perform the corner detection or the detection of other features. In this embodiment, the corner detecting arithmetic logic 122a may employ the FAST (Features from Accelerated Segment Test) algorithm to perform the corner detection. For example, the corner detecting arithmetic logic 122a may be configured to detect at least one corner feature in the digital image $S_1'$ and save information associated with the corner feature, e.g. the feature point coordinate (i.e. the corner coordinate) into a memory unit 150 or directly output the corner coordinate. In one corner detection algorithm, the method of performing the corner detection by the corner detecting arithmetic logic 122a may be described by FIGS. 4A and 4B, wherein FIG. 4B shows a schematic diagram of performing the corner detection on a partial image of FIG. 4A. From FIG. 4B, it is shown that sixteen continuously connected pixels may be selected around each selected pixel P as shown by the arrangement in FIG. 4B, wherein if there are nine or more than nine "continuous" pixels having gray values larger than or smaller than the gray value of the selected pixel P, the selected pixel P may be identified as a "corner"; if not, the selected pixel P is not identified as a "corner". It is appreciated that FIGS. 4A and 4B only show one embodiment, the feature detection method that can be used in the present disclosure is not limited thereto.

When the image sensor 100 is operated in an environment having a complex background, the digital image $S_1'$ may contain a large amount of corner features. Accordingly, in order to save system resources, the feature detection circuit 122 preferably further includes a sparsity arithmetic logic 122' configured to select an extreme corner feature within a predetermined pixel range and remove the corner feature(s) other than the extreme corner feature so as to reduce the number of corner features in the digital image $S_1'$.

In an optional embodiment, the sparsity arithmetic logic 122' may further include a corner response arithmetic logic 122b, as shown in FIG. 3, configured to fix, re-confirm or optimize the feature point (e.g. the above "corner") detected by the corner detecting arithmetic logic 122a, wherein the corner response arithmetic logic 122b may use Harris algorithm to optimize the corner detection. Specifically speaking, it is able to calculate the "Harris Corner Response" of the detected feature points to be served as the response value of each of the feature points. A threshold may be used to filter out some feature points having a lower response value or to perform the sparsification of the feature points in the space, wherein the sparsification may be defined as reserving one or a plurality of feature points within a predetermined pixel range having a maximum response value and removing other feature points.

In order to avoid the corner detecting arithmetic logic 122a or the corner response arithmetic logic 122b generating too many feature points to cause the memory unit 150 having insufficient storage space or in order to increase the total calculation efficiency, in this embodiment the feature detection circuit 122 may further include a non-maximum suppression arithmetic logic 122c, as shown in FIG. 3, configured to further perform the selection and filtering of the detected feature points, wherein the non-maximum suppression arithmetic logic 122c may use a matrix having 5×5, 3×3 or other sizes to sequentially filter the feature points in the digital image $S_1'$. For example referring to FIG. 5, it shows a digital image $S_1'$ outputted by the light sensitive device 110. The corner response arithmetic logic 122b is configured to calculate a corner response value corresponding to each corner coordinate (e.g. feature points having a higher response value shown as $C_1$ and feature points having a lower response value shown as $C_2$ herein). The non-maximum suppression arithmetic logic 122c uses a predetermined pixel range M (e.g. a matrix) having a 5×5 size to sequentially scan the digital image $S_1'$ and when a plurality of feature points are blocked by the predetermined pixel range M at the same time, the feature point(s) having the maximum response value is reserved but other feature point(s) is removed (e.g. reserving $C_1$ and removing $C_2$) so as to effectively decrease the concentrated feature points within a predetermined range thereby achieving the sparsification of the feature points in the image space. The term "remove" mentioned above is to remove the corner coordinate (e.g. $C_2$) within the predetermined pixel range M that does not have a maximum corner response value from the memory unit. In other words, the sparsity arithmetic logic 122' is configured to calculate a response value of each feature point in the digital image $S_1'$ and reserve the extreme feature point (e.g. feature point $C_1$) within the predetermined pixel range M having the maximum response value and/or reserve a part of the feature points by using a response value threshold.

In addition, the feature points obtained through above arithmetic logic (including the corner detecting arithmetic logic 122a and the sparsity arithmetic logic 122') include only the position information, i.e. no unique difference between feature points. Therefore, the feature detection circuit 122 may further include a feature describing arithmetic logic 122d configured to calculate a recognition feature, e.g. including the rotation angle, brightness distribution and/or included angle, of every feature point through a predetermined calculation method. The recognition feature gives every feature point a uniqueness such that the digital signal processing circuit 120 may perform the feature matching according to the recognition feature of every feature point to realize a better matching performance In addition, when the feature detection circuit 122 includes the sparsity arithmetic logic 122' for removing the feature points within the predetermined pixel range M that do not have the maximum response value, the feature describing arithmetic logic 122d is configured to only calculate the recognition feature of the feature point having the maximum corner response value (i.e. the reserved feature point).

In addition, the digital signal processing circuit 120 may further include a feature matching circuit 124 and a feature tracking circuit 126, wherein when the above feature detection circuit 122 detects the feature point, the feature matching circuit 124 performs the feature point matching of the feature points in two similar digital images, e.g. matching the feature points having the most similar recognition features in successive digital images $S_1'$. In one embodiment, after the feature matching circuit 124 performs the feature point matching between the feature points in two similar digital images captured at different times, the feature tracking circuit 126 may perform the feature point tracking according to the displacement generated by the matched feature points, i.e. identifying the movement of the target object or the image sensor itself according to the generated displacement for being applied to various electronic devices. In another embodiment, the feature tracking circuit 126 may directly track at least one feature point in successive digital images $S_1'$ or track the feature point(s) having the maximum response value. It should be mentioned that the feature matching circuit 124 and the feature tracking circuit 126 mentioned above may be implemented by hardware, firmware or software without particular limitation and may be modified according to the user consideration even though the feature detection circuit 122 above is described exemplarily by hardware in the present disclosure.

In this embodiment, the image sensor 100 may further include a sensor control circuit 140 and a memory unit 150, wherein the sensor control circuit 140 may control the image output signal and the feature point output signal of the light sensitive device 110. More specifically speaking, the image sensor 100 of this embodiment may include an image signal processing circuit 170, wherein the image signal processing circuit 170 may receive and process the digital image $S_1'$ generated by the light sensitive device 110. The sensor control circuit 140 may control the image output (e.g. outputting preview images) of the image signal processing circuit 170 and the feature point output (e.g. outputting coordinate, recognition feature) of the digital signal processing circuit 120. In other words, the image sensor 100 of the present embodiment may not only output the preview images real-timely but also detect the coordinate or other features of the feature point in the digital image $S_1'$. In this embodiment, the memory unit 150 is adapted to save the information mentioned above. In other embodiments, the image signal processing circuit 170 and the digital signal processing circuit 120 may be combined as a single processing circuit.

It should be mentioned that the present embodiment is exemplarily described by the digital image $S_1'$ captured by the light sensitive device 110. However, in other embodiments the method provided by the present disclosure may be adapted to process images captured by an external light sensitive device and identify the feature point information of the images, and as the details thereof are similar to those described above, they are not repeated herein.

In addition, the image sensor 100 of this embodiment may further include an input/output (I/O) interface 180 for performing the data transmission, wherein the I/O interface 180 may include a serial interface 182 or a parallel interface 184.

Figure 5:
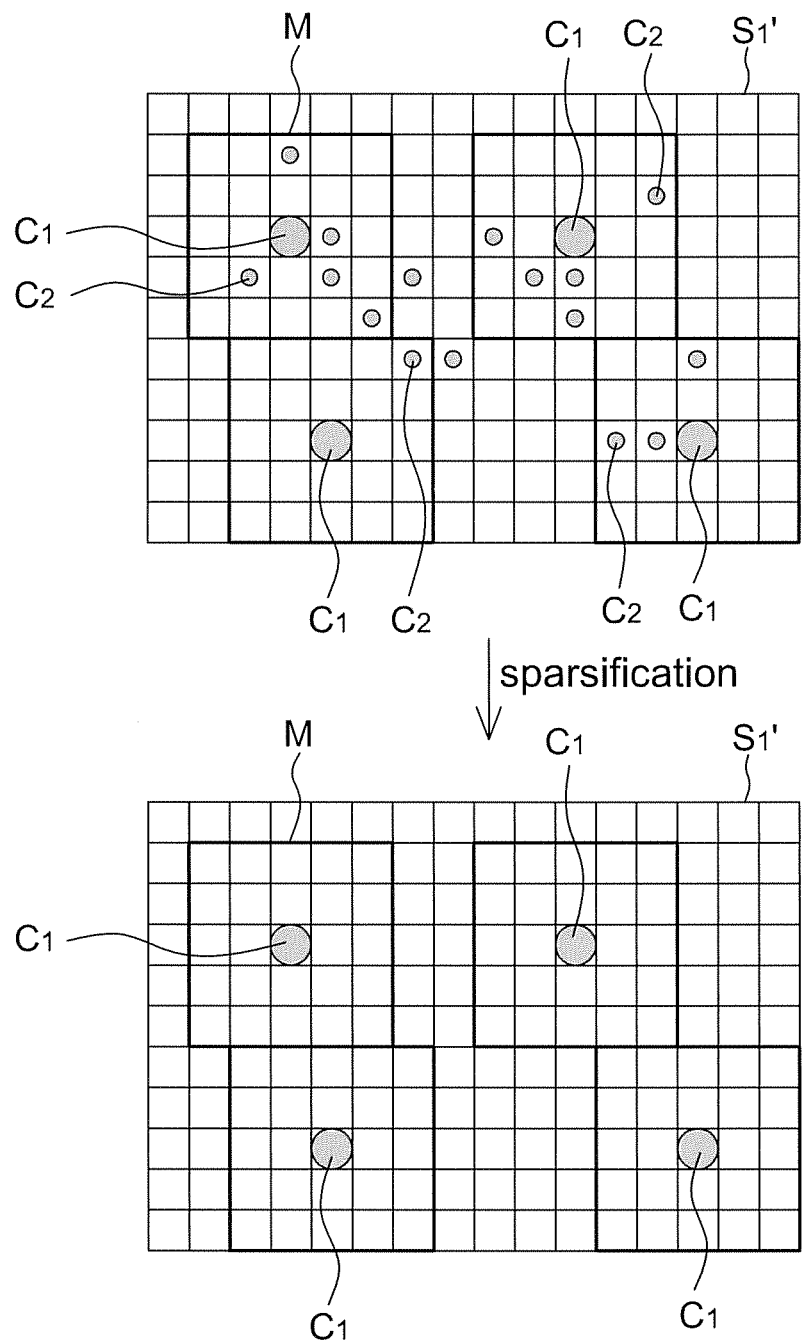
FIG. 5 shows an operational schematic diagram of the sparsity arithmetic logic.
Figure 6:
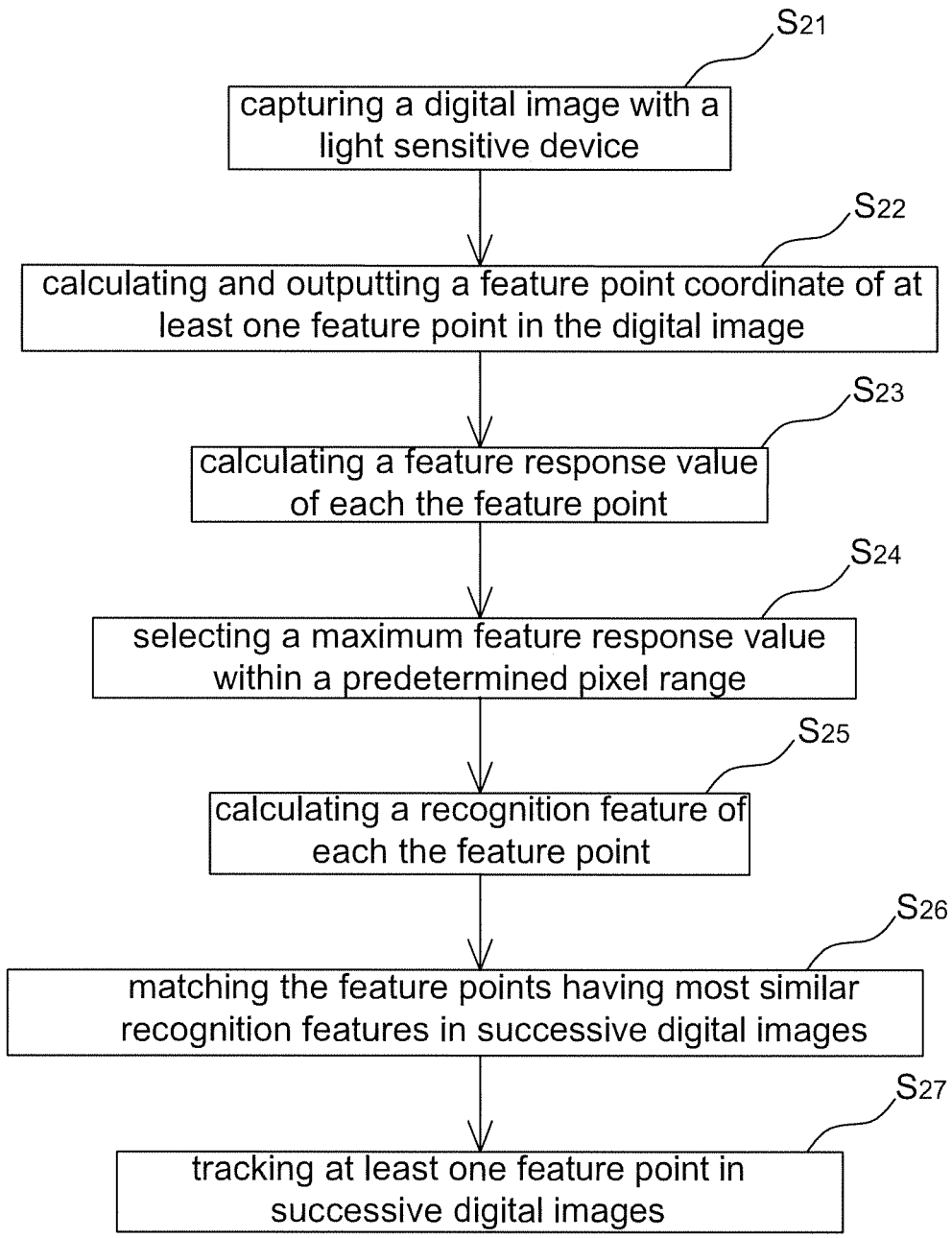
FIG. 6 shows a flow chart of the operating method of the image sensor according to the embodiment of the present disclosure.

Referring to FIG. 6, the operating method of the image sensor according to the embodiment of the present disclosure may include the steps of: capturing a digital image with a light sensitive device (Step $S_{21}$); calculating and outputting a feature point coordinate of at least one feature point in the digital image with a processing circuit (Step $S_{22}$); calculating a feature response value of each the feature point (Step $S_{23}$); selecting a maximum feature response value within a predetermined pixel range (Step $S_{24}$); and calculating a recognition feature of each the feature point (Step $S_{25}$), wherein details of the present embodiment have been described in FIGS. 2-5 and corresponding descriptions thereof and thus are not repeated herein. It should be mentioned that it is not necessary to implement all the steps mentioned above and it is possible to implement only a part of the steps according to different requirements. For example, if the image sensor 100 is operated in an environment having a simple background, the steps $S_{23}$ and $S_{24}$ may be omitted and the Step $S_{25}$ may be performed directly so as to calculate the recognition feature of every feature point in the digital image $S_1'$, wherein the recognition feature may include the rotation angle, brightness distribution, included angle or other features capable of showing the uniqueness of the feature point without particular limitation.

In the present disclosure, the image sensor 100 may not only output a preview image according to a digital image $S_1'$ through the image signal processing circuit 170 but also calculate and output a feature point coordinate of at least one feature point in the digital image $S_1'$ through the digital signal processing circuit 120 (Step $S_{22}$). In addition, in order to save system resources (e.g. the used space of the memory unit 150 and the calculation time of the digital signal processing circuit 120), it is able to reserve only the information associated with the feature point(s) within a predetermined pixel range having a maximum feature response value and remove other feature pointes that do not have the maximum feature response value as shown in FIG. 5 so as to significantly increase the sparsity of the feature points. For example in calculating the displacement, it is able to use the feature matching circuit 124 to match the feature points having the most similar recognition features in successive digital images $S_1'$ (Step $S_{26}$). In performing the object tracking, it is able to use the feature tracking circuit 126 to track at least one feature point or the feature point(s) having the maximum response value mentioned above in successive digital images $S_1'$ (Step $S_{27}$). It should be mentioned that the feature matching circuit 124 and the feature tracking circuit 126 may be implemented according to the system requirements.

As mentioned above, the image sensor 100 of the present embodiment may output the preview image real-timely and the position or feature value of the feature point in the digital image, perform the feature point matching according to the feature points detected in successive digital images and further obtain the motion vector of the object having feature point(s) in an image sequence. In addition, the image sensor 100 of this embodiment may use the detected feature point to track the feature points in the followed image sequence. When the feature points under tracking disappear or are not enough, it is able to perform the feature point detection of the digital image again so as to maintain the number of the feature points under tracking. In addition, the image sensor 100 of this embodiment may use a plurality of image sensors having the feature detection function to perform the feature point matching according to the feature points acquired at the same time but at different locations. It is able to use the physical spatial relationship of the image sensors to obtain the depth of the object having feature point(s) in the digital image for being applied to the 3D vision application.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed. Furthermore, any embodiment or claim of the present invention is not necessary to achieve all objects, advantages and novel features disclosed herein. Meanwhile, the summary and title are only for searching of patent documents but not to limit the scope of claims of the present disclosure.

What is claimed is:

1. An image sensor, comprising:
   a light sensitive device comprising:
      a light sensing array sensing light beams impinging thereon to generate an image signal, and having an output terminal to output the image signal, and
      an analog-to digital converter having an input terminal electrically coupled to the output terminal of the light sensing array for receiving the image signal, and converting the image signal into a digital image;
   a memory, and
   a digital signal processing circuit electrically coupled to the light sensitive device and the memory configured for
      receiving the digital image from the light sensitive device,
      detecting corner coordinates of at least one corner feature in the digital image for storage within the memory,
      calculating a corner response value corresponding to each of the stored corner coordinates, and
      sequentially scanning the digital image with a predetermined pixel range and removing, from the memory, the stored corner coordinates that do not have a maximum response value among the stored corner coordinates located within the predetermined pixel range.

2. The image sensor as claimed in claim 1, wherein the digital signal processing circuit further calculates a recognition feature of the corner feature having the maximum response value.

3. The image sensor as claimed in claim 2, wherein the digital signal processing circuit further matches the corner features having most similar recognition features in successive digital images.

4. The image sensor as claimed in claim 1, wherein the digital signal processing circuit further tracks the corner feature having the maximum response value in successive digital images.

5. The image sensor as claimed in claim 1, further comprising an image signal processing circuit electrically coupled to the light sensitive device for receiving the digital image and outputting a preview image according to the digital image.

6. The image sensor as claimed in claim 2, wherein the recognition feature comprises at least one of a rotation angle, a brightness distribution and an included angle.

* * * * *